April 29, 1930.  M. C. NEUENFELT  1,756,095
BEARING BOX AND LINING THEREFOR
Filed June 6, 1928
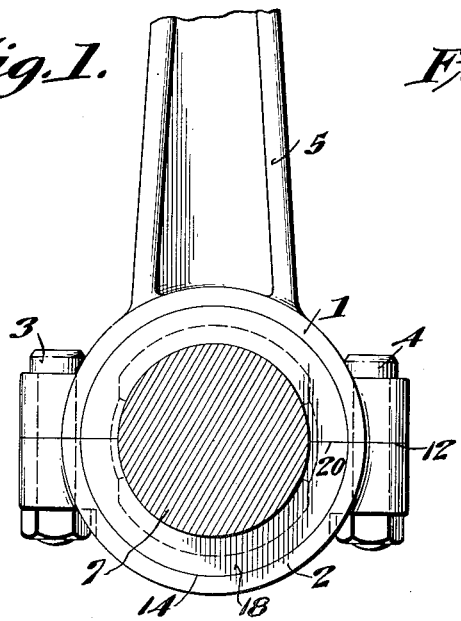
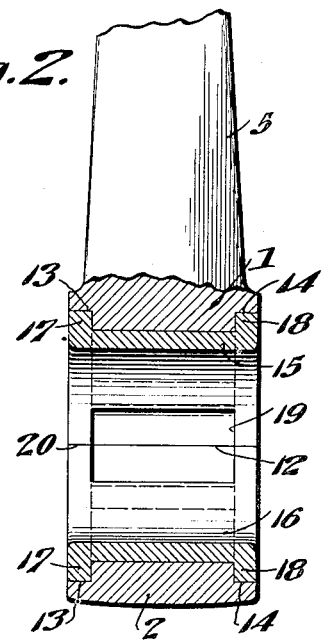
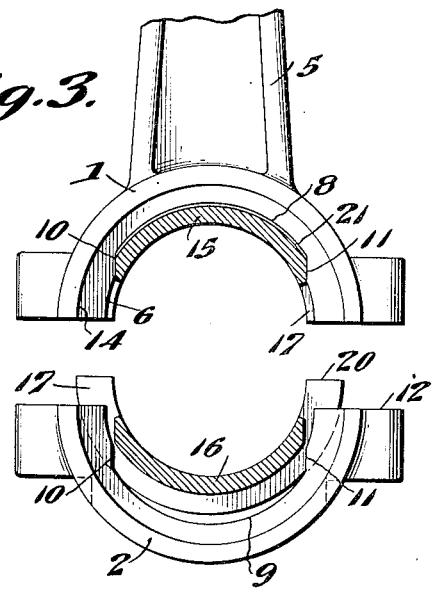
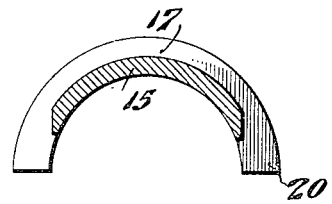
Inventor
Mary C. Neuenfelt
By Lloyd W. Patch
Attorney Patented Apr. 29, 1930

1,756,095

UNITED STATES PATENT OFFICE

MARY C. NEUENFELT, OF DETROIT, MICHIGAN

BEARING BOX AND LINING THEREFOR

Application filed June 6, 1928. Serial No. 283,357.

My present invention relates to improvements in bearing boxes and linings therefor, and particularly to a bearing structure adapted for use in engines intended for use in aeroplanes, automobiles, and in other like connections, where a particularly well fitted and yet free working bearing is desired and where proper lubrication must be maintained.

An object of this invention is to provide a journal box having a lining which can be accurately and closely fitted to a shaft, pin, or other part, and which will not pinch or bind at the sides.

Another object is to so construct and mount the parts that a new lining can be readily fitted, or an old lining can be adjusted to take up wear or suit particular requirements of use.

Still another object and purpose of my present invention is to so construct the journal box and bearing lining that proper lubrication is insured at all times to prevent scoring or binding of the parts.

With these and other object in view which will be apparent to those skilled in the art, my present invention embraces certain novel features of construction and combinations of parts which will be hereinafter set forth in connection with the drawing and then particularly pointed out in the claims.

In the drawing:

Figure 1 is a view in side elevation of a journal box constructed in accordance with my present invention.

Fig. 2 is a vertical sectional view taken axially through the bearing.

Fig. 3 is a view in side elevation showing the journal box members separated and with the bearing linings in section.

Fig. 4 is a detail sectional view to better show the form and construction of one of the bearing linings.

In the present instance I have illustrated one improved structure as applied upon the crank end of a connecting rod such as is used in engines constructed to be installed in aeroplanes, automobiles, and the like; but, it will be understood that the structure is readily adapted for use in any connection where a journal box is required.

The bearing members 1 and 2 are held together by bolts 3 and 4, or other suitable fastenings, and these bearing members can be made to external sizes substantially conforming to standard practice, the bearing member 1 being in the present instance shown as a part of an engine connecting rod 5.

The bearing members 1 and 2 are turned out or are otherwise formed to provide bearing openings 6 therein of greater diameter than the shaft 7, or other member, to be mounted in the journal box. The middle portion of each bearing member within the bearing opening 5 is turned or shaped out to provide concentric grooves or recesses 8 and 9, the ends 10 and 11 of these grooves or recesses 8 and 9 being formed in planes substantially at right angles to the meeting faces 12 of the bearing members and being spaced apart a distance corresponding substantially to the diameter of the shaft 7.

At the ends of bearing members 1 and 2 semi-circular grooves 13 and 14 are turned or otherwise formed to provide annular grooves entirely around the bearing opening at each end of the journal box when the bearing members 1 and 2 are fitted together. Bushings or linings 15 and 16 are shaped to fit within the recesses 8 and 9 with their ends having a sliding fit against the ends 10 and 11 of the recesses, and these bushings or linings are made of a thickness such that they will project from the recesses, the inner faces of the bushings or linings being hollowed out on a diameter corresponding substantially to the diameter of shaft 7. By extensive experimenting I have found that excellent results are obtained when the ends 10 and 11 of the recesses and the corresponding ends of the bushings or linings 15 and 16 are stopped substantially one-sixteenth of the circumference of the shaft 7 from the abutting faces 12 of the two members 1 and 2, on each side. This formation disposes the bearing linings or bushings 15 and 16 upon the opposite sides of shaft 7 at points where the maximum bearing occurs and as the portions of the bushings or linings adjacent the meeting faces 12 of the bearing members 1 and 2 are omitted there is no possibility of the linings or bushings pinching the shaft at these points due to improper adjusting and fitting or to wear.

At the end of each lining or bushing members 15 and 16 I provide the semi-circular flanges 17 and 18, when the bushing or lining members are fitted in place form annular rings within the grooves 13 and 14. Oil pockets or recesses 19 are provided between the flanges 17 and 18 on each side of the shaft, and oil supplied to or collected within these pockets or recesses will be constantly in contact with the bearing portion of the shaft.

Due to the fact that the lining or bushing members bear upon the opposite sides of the shaft throughout substantially three-eighths of its circumference at the two diametrically opposite points, a full bearing surface is provided to prevent undue wear or displacement of the parts through improper fitting. Should it be found necessary to adjust the bushings the ends 20 of the flanges 17 and 18 can be dressed down to give a proper fit; and, if necessary, shims 21 can be introduced into one or both recesses 8 and 9 behind one or both of the bushings 15 and 16. With this manner of adjustment, should either or both of the bushings become worn to require adjustment, this can be readily accomplished by the introduction of shims 21 of any desired thickness and the bushings or linings will not pinch or bind upon the shaft adjacent the meeting faces 12 of the bearing members 1 and 2 as this portion of the structure is open.

While I have herein shown and described only certain specific embodiments of my invention and have suggested only certain possible modifications, it will be appreciated that many changes and variations can be made in the form, construction and arrangement of the parts, and in the manner of assembling the same, without departing from the spirit and scope of my invention.

I claim:

1. A shaft journal box comprising two bearing members to be secured together in abutting relation and having recesses therein forming a central opening of greater diameter than the diameter of the shaft to be mounted, said members each being recessed concentrically within the central opening intermediate the points of abutment and said recesses being formed with the ends thereof in planes substantially at right angles to the abutment faces of the two members, and bushings of corresponding form to be fitted within the last-mentioned recesses in a line substantially corresponding with the planes of the ends thereof in a manner that said bushings extend from said recesses to contact with the shaft.

2. A shaft journal box comprising two bearing members to be secured together in abutting relation and having recesses therein forming a central opening of greater diameter than the diameter of the shaft to be mounted, said members each being recessed within the central opening intermediate the points of abutment and said recesses being formed with the ends thereof in planes substantially at right angles to the abutment faces of the two members, bushings of corresponding form to be fitted within the last-mentioned recesses in a line substantially corresponding with the planes of the ends thereof in a manner that said bushings extend from said recesses to contact with the shaft, said bushings having their ends spaced from the abutment points of the two members to provide oil recesses, said bearing members having annular grooves on opposite ends thereof around the central recesses, and flanges on the ends of the bushings to lie within said annular grooves and extending to abut at their ends to close the oil recesses.

In testimony whereof I hereunto affix my signature.

MARY C. NEUENFELT.